US008627078B2

(12) United States Patent
Oba et al.

(10) Patent No.: US 8,627,078 B2
(45) Date of Patent: Jan. 7, 2014

(54) COMMUNICATION APPARATUS AND COMPUTER PROGRAM PRODUCT

(75) Inventors: Yoshihiro Oba, Kanagawa (JP); Mitsuru Kanda, Tokyo (JP); Yasuyuki Tanaka, Kanagawa (JP); Seijiro Yoneyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/551,352

(22) Filed: Jul. 17, 2012

(65) Prior Publication Data

US 2013/0073852 A1 Mar. 21, 2013

(30) Foreign Application Priority Data

Sep. 15, 2011 (JP) ................................. 2011-201602

(51) Int. Cl.
*H04L 29/06* (2006.01)
(52) U.S. Cl.
USPC ........................................................ 713/168
(58) Field of Classification Search
USPC ........................................................ 713/168
See application file for complete search history.

(56) References Cited

U.S. PATENT DOCUMENTS

| 6,363,057 | B1 | 3/2002 | Ardalan et al. | |
|---|---|---|---|---|
| 2007/0097934 | A1* | 5/2007 | Walker et al. | 370/338 |
| 2008/0141031 | A1* | 6/2008 | Oba et al. | 713/170 |
| 2009/0103731 | A1 | 4/2009 | Sarikaya | |
| 2011/0085498 | A1 | 4/2011 | Oba et al. | |
| 2011/0271110 | A1* | 11/2011 | Ohba et al. | 713/168 |
| 2012/0246473 | A1* | 9/2012 | Oba et al. | 713/168 |

FOREIGN PATENT DOCUMENTS

| WO | WO 2007/091577 A1 | 8/2007 |
|---|---|---|
| WO | WO 2011/064865 A1 | 6/2011 |
| WO | WO 2011/064868 A1 | 6/2011 |

OTHER PUBLICATIONS

Extended European Search Report issued by the European Patent Office on Jan. 7, 2013, for European Patent Application No. 12176694.3.
Ohba et al., "An Authentication Client Proxy Mechanism for Resource-Constrained Devices," Transmission and Distribution Conference and Exposition (May 7, 2012), pp. 1-8.
Clancy et al., "EAP Generalized Pre-Shared Key (EAP GPSK)," draft-ietf-emu-eap-gpsk-06 (Jul. 6, 2007), pp. 1-35.

* cited by examiner

*Primary Examiner* — Michael Pyzocha
(74) *Attorney, Agent, or Firm* — Finnegan, Henderson, Farabow, Garrett & Dunner, L.L.P.

(57) ABSTRACT

According to an embodiment, a communication apparatus establishes communication with an external apparatus through a higher-level device. The communication apparatus includes a main processor and a key generator. The main processor receives a data authentication request including data to be authenticated, a first key specification, and a message authentication algorithm identifier from the higher-level device. The key generator retains a key hierarchy used by an authentication protocol that is used between the higher-level device and the external apparatus, and to generate a first key by use of the key hierarchy and the first key specification. The main processor generates a message authentication code for the data to be authenticated by use of the message authentication algorithm, which is identified by the message authentication algorithm identifier, and the first key, and transmits a data authentication response including the message authentication code to the higher-level device.

22 Claims, 14 Drawing Sheets

COMMUNICATION APPARATUS AND COMPUTER PROGRAM PRODUCT

CROSS-REFERENCE TO RELATED APPLICATIONS

This application is based upon and claims the benefit of priority from Japanese Patent Application No. 2011-201602, filed on Sep. 15, 2011; the entire contents of which are incorporated herein by reference.

FIELD

Embodiments described herein relate generally to a communication apparatus and a computer program product.

BACKGROUND

There has conventionally been known a technique of establishing communication between an apparatus such as an electric meter and an external apparatus such as a remote server through a TCP (Transmission Control Protocol)/IP (Internet Protocol) gateway.

In this technique, the electric meter transmits measurement data measured by itself to the TCP/IP gateway as a non-IP packet by using Layer 2 frame, and the TCP/IP gateway transmits the measurement data received from the electric meter to the remote server by using HTTP (Hyper Text Transfer Protocol) over TCP/IP.

This configuration can simplify the electric meter in the communication between the electric meter and the remote server.

However, the above-mentioned conventional technique entails a security problem, which is such that an invalid apparatus can undesirably communicate with the external apparatus.

DETAILED DESCRIPTION

According to an embodiment, a communication apparatus establishes communication with an external apparatus through a higher-level device. The communication apparatus includes a main processor and a key generator. The main processor is configured to receive a data authentication request including data to be authenticated, a first key specification, and a message authentication algorithm identifier from the higher-level device. The key generator is configured to retain a key hierarchy used by an authentication protocol that is used between the higher-level device and the external apparatus, and to generate a first key by use of the key hierarchy and the first key specification. The main processor generates a message authentication code for the data to be authenticated by use of the message authentication algorithm, which is identified by the message authentication algorithm identifier, and the first key, and transmits a data authentication response including the message authentication code to the higher-level device.

Figure 1:
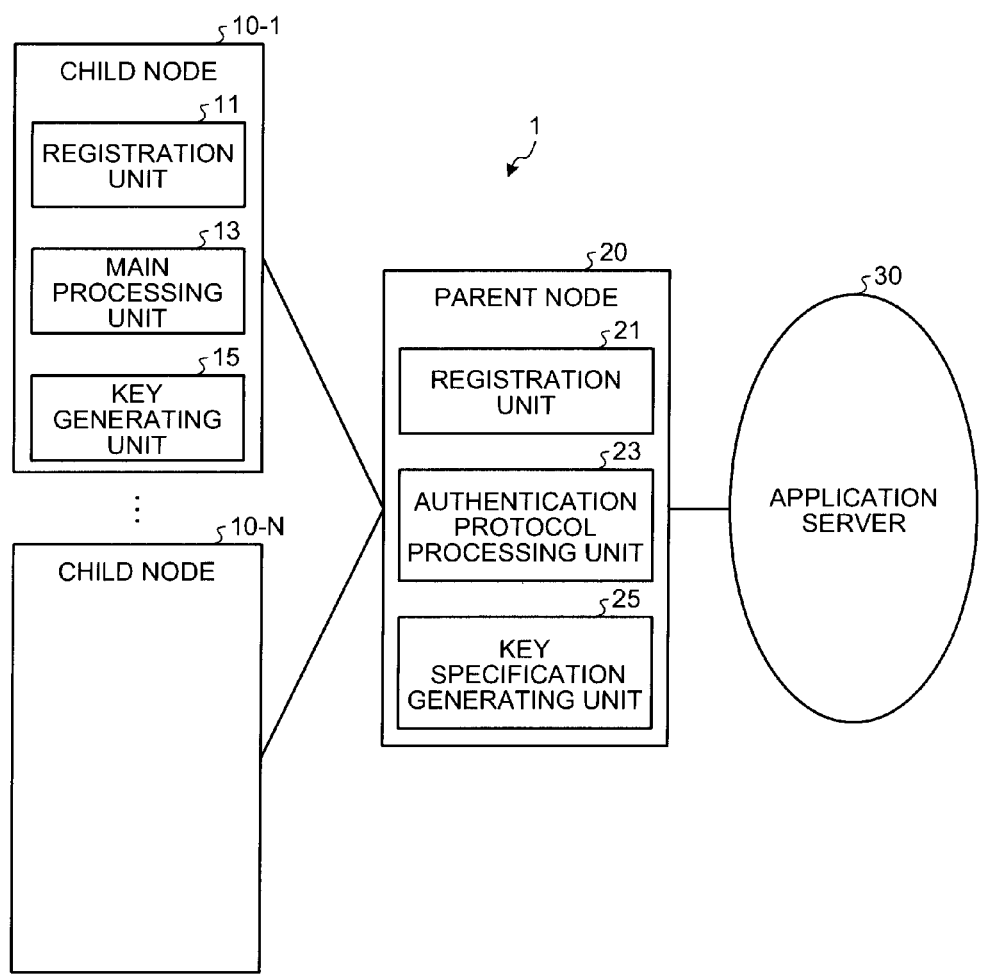
FIG. 1 is a block diagram illustrating an example of a communication system according to an embodiment.

FIG. 1 is a diagram illustrating one example of a communication system 1 according to an embodiment. As illustrated in FIG. 1, the communication system 1 includes plural child nodes 10-1 to 10-N, a parent node 20, and an application server 30.

The communication between the plural child nodes 10-1 to 10-N and the parent node 20 may be realized by a network such as a wired LAN (Local Area Network) or wireless LAN or through a short range wireless communications such as Bluetooth or ZigBee. The communication between the parent node 20 and the application server 30 may be realized by a network such as a wired LAN (Local Area Network) or wireless LAN, for example.

Although each of the child nodes 10-1 to 10-N has a different key hierarchy (described later in detail), they have the same intended purpose, components, and operation to be executed. Therefore, the child node 10-1 will mainly be described, and the child nodes 10-2 to 10-N will not be described below.

The child node 10-1 (communication apparatus, one example of a lower-level device) is mounted to a gas meter, electric meter, home appliance, illumination device, sensor, actuator, or electric vehicle, for example, and communicates with the application server 30 (one example of an external apparatus) via the parent node 20 (communication apparatus, one example of a higher-level device).

The child node 10-1 includes a registration unit 11, a main processing unit 13, and a key generating unit 15. The registration unit 11, the main processing unit 13, and the key generating unit 15 may be realized by a processing apparatus including a CPU (Central Processing Unit), RAM (Random Access Memory), and ROM (Read Only Memory), may be realized by an IC (Integrated Circuit), or may be realized by using both the processing apparatus and IC.

The registration unit 11 transmits a list of identifiers of an authentication protocol using a key hierarchy retained by the later-described key generating unit 15 and a registration request including an authentication identifier of the child node 10-1 to the parent node 20, and receives a registration response from the parent node 20. The registration unit 11 preliminarily retains the list of the identifiers of the authentication protocol using the key hierarchy retained by the key generating unit 15 and the authentication identifier of the child node 10-1.

The main processing unit 13 receives a data authentication request including data to be authenticated, a first key specification, and a message authentication algorithm identifier from the parent node 20. The main processing unit 13 generates a message authentication code for the data to be authenticated by using the massage authentication algorithm identified by the message authentication algorithm identifier and a first key generated from the first key specification by the later-described key generating unit 15, and transmits a data authentication response including the message authentication code to the parent node 20. The main processing unit 13 preliminarily retains the message authentication algorithm, and generates the message authentication code by using the message authentication algorithm specified (identified) by the message authentication algorithm identifier.

The main processing unit 13 may be configured to retain a key cache including the first key specification contained in the data authentication request that has been received in the past and the first key generated from the first key specification, in order to compare the first key specification included in the data authentication request newly received and the first key specification included in the key cache. When they agree with each other, the main processing unit 13 may generate the message authentication code for the data to be authenticated included in the newly received data authentication request by using the first key included in the key cache and the message authentication algorithm identified by the message authentication algorithm identifier included in the newly received data authentication request.

The main processing unit 13 may also receive a key request including a second key specification from the parent node 20, and transmit a key response, including a second key generated from the second key specification by the later-described key generating unit 15, to the parent node 20.

The key generating unit 15 retains the key hierarchy used by the authentication protocol used between the parent node 20 and the application server 30. When the main processing unit 13 receives the data authentication request, the key generating unit 15 generates the first key by using the first key specification included in the data authentication request and the retained key hierarchy. When the main processing unit 13 receives the key request, the key generating unit 15 generates the second key by using the second key specification included in the key request and the retained key hierarchy. The generated first key and the second key belong to the key hierarchy may be retained by the key generating unit 15.

The parent node 20 is mounted to, for example, an electric meter, HEMS (Home Energy Management System) server, concentrator, router, wireless LAN access point, LAN switch, or electric vehicle, and allows the plural child nodes 10-1 to 10-N and the application server 30 to communicate with each other through the parent node 20.

The parent node 20 includes a registration unit 21, an authentication protocol processing unit 23, and a key specification generating unit 25. The registration unit 21, the authentication protocol processing unit 23, and the key specification generating unit 25 may be realized by a processing apparatus including a CPU, RAM, and ROM, may be realized by an IC, or may be realized by using both the processing apparatus and IC.

The registration unit 21 receives a list of identifiers of an authentication protocol using the key hierarchy retained by the corresponding child node and a registration request including an authentication identifier of the corresponding child node from each of the plural child nodes 10-1 to 10-N. During the registration period of the corresponding child node, the registration unit 21 retains the content of the registration request and the address of the corresponding child node in association with each other, and transmits the registration response to the child node whose registration request is received. The registration unit 21 preliminarily retains the addresses of the plural child nodes 10-1 to 10-N, and associates each of these addresses with the content of the registration request. The value of the registration period may be further included in the registration request.

The authentication protocol processing unit 23 executes the process other than the process of generating the message authentication code out of the processes of the authentication protocol used between the parent node 20 and the application server 30. In this embodiment, the authentication protocol includes PANA (Protocol for carrying Authentication for Network Access) method and EAP (Extensible Authentication Protocol) method. However, the authentication protocol is not limited thereto.

The authentication protocol processing unit 23 transmits a data authentication request including the data to be authenticated, a first key specification generated by the later-described key specification generating unit 25, and the message authentication algorithm identifier to the child node having the key hierarchy used by the authentication protocol, out of the plural child nodes 10-1 to 10-N. The authentication protocol processing unit 23 acquires the data to be authenticated and the message authentication algorithm identifier from the message transmitted and received between the application server 30 and the authentication protocol processing unit 23. In this embodiment, the data to be authenticated is application data exchanged between the application server 30 and the authentication protocol processing unit 23. However, the data to be authenticated is not limited thereto. The authentication protocol processing unit 23 receives the data authentication response including the message authentication code for the data to be authenticated from the child node to which the authentication protocol processing unit 23 transmitted the data authentication request. The authentication protocol processing unit 23 executes the message authentication of the data to be authenticated by using the message authentication code received from the child node.

The authentication protocol processing unit 23 may transmit the key request including the second key specification generated by the later-described key specification generating unit 25 to the child node, having the key hierarchy used by the authentication protocol, out of the plural child nodes 10-1 to 10-N, and receive the key response including the second key generated from the second key specification. The authentication protocol processing unit 23 receiving the second key encrypts or decrypts the data to be authenticated by using the second key. In this embodiment, it is supposed that the second key included in the key response is shared with the application server 30.

The key specification generating unit 25 generates the first key specification that is for allowing the child node, having the corresponding key hierarchy, out of the plural child nodes 10-1 to 10-N to generate the first key belonging to the key hierarchy used by the authentication protocol. The key specification generating unit 25 may also generate the second key specification that is for allowing the child node, having the corresponding key hierarchy, out of the plural child nodes 10-1 to 10-N to generate the second key belonging to the key hierarchy used by the authentication protocol.

The key specification is specified by a complete specifier, which is a sequence list of a complete specifying component including a type of key, a length of a parent key, a key derivation function identifier, a hash function identifier, an output length of the key derivation function, a start position of a key sequence during the output of the key derivation function, an end position of the key sequence during the output of the key derivation function, and a key label, or a reference specifier that is an integer value corresponding to the complete specifier. The key specification includes a specifier type identifying whether the designation is executed by the complete specifier or by the reference specifier. The value of the reference specifier is assigned by the transmission source of the data authentication response, and reported by the data authentication response. The key specification generating unit 25 retains the correspondence between the reference specifier and the complete specifier. With this configuration, the key specification generating unit 25 can generate the key specification by the reference specifier, not by the complete specifier. The key specification may be specified only by the complete specifier.

The plural child nodes 10-1 to 10-N and the parent node 20 may transmit and receive the registration request, the registration response, the data authentication request, the data authentication response, the key request, and the key response by using a protocol of any one of a data link layer, a network layer, and a transport layer.

The plural child nodes 10-1 to 10-N and the parent node 20 may transmit and receive, after encryption or message authentication, the registration request, the registration response, the data authentication request, the data authentication response, the key request, and the key response. In this case, a common key shared between each of the plural child nodes 10-1 to 10-N and the parent node 20 is used for the encryption and message authentication. The common key is desirably different for each child node.

Figure 2:
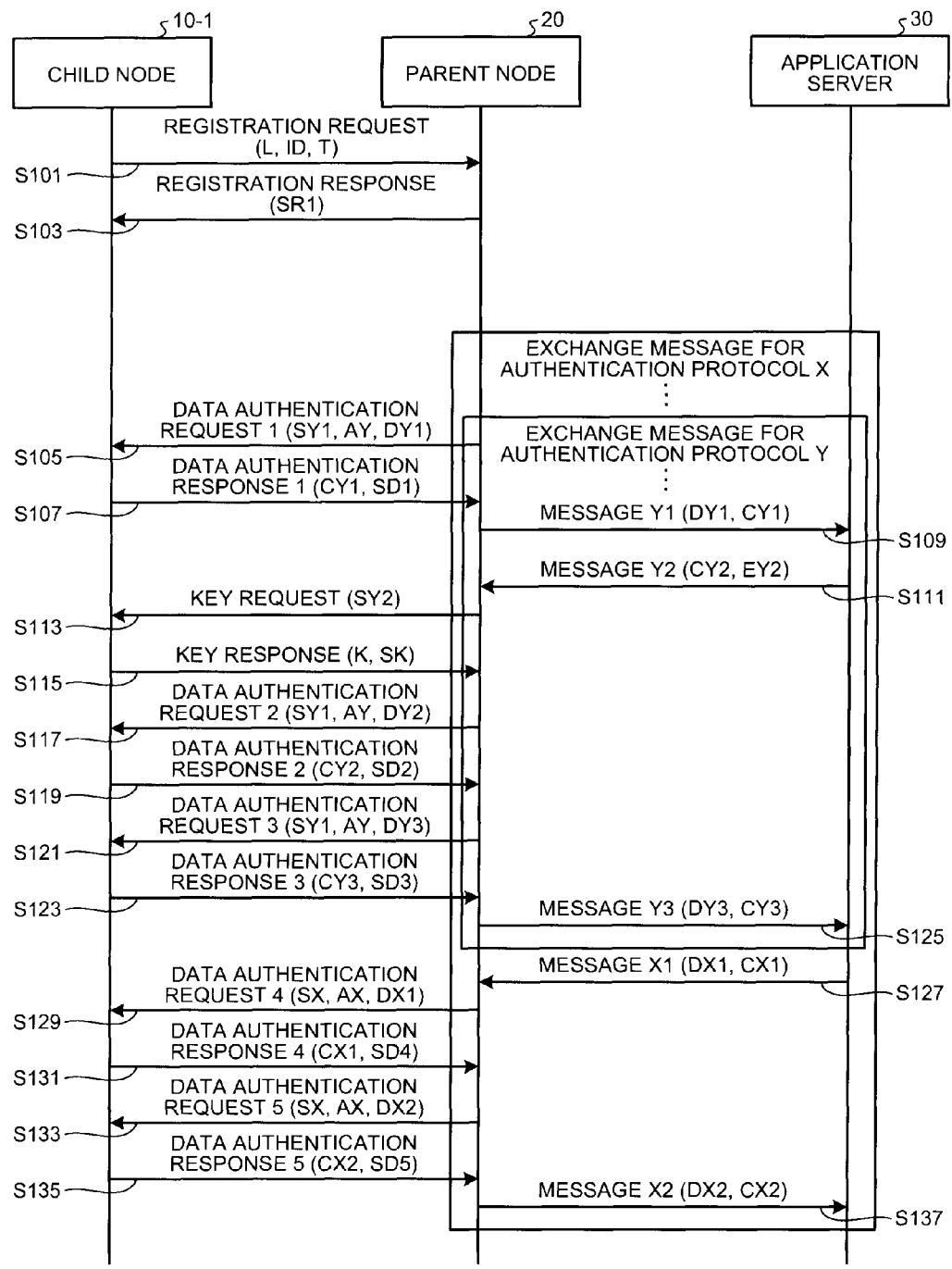
FIG. 2 is a sequence view illustrating an example of a process of the communication system according to the embodiment.

FIG. 2 is a sequence view illustrating one example of a process executed by the communication system 1 in this embodiment.

In the example illustrated in FIG. 2, the communication system 1 makes authentication by using two types of authentication protocols which are an authentication protocol X and an authentication protocol Y. Specifically, the message of the authentication protocol Y is encapsulated by the message of the authentication protocol X, and the key used by the authentication protocol X for the message authentication is generated from the key hierarchy used by the authentication protocol Y. In the example illustrated in FIG. 2, the authentication protocol X is PANA (RFC 5191), and the authentication protocol Y is EAP-GPSK (RFC 5433). However, the protocols are not limited thereto.

In the example illustrated in FIG. 2, only the communication between the child node 10-1 and the parent node 20 is illustrated as for the communication between the plural child nodes 10-1 to 10-N and the parent node 20. The message of the authentication protocol X and the message of the authentication protocol Y transmitted and received between the parent node 20 and the application server 30 illustrated in FIG. 2 are only those to which the message authentication code is added. Therefore, the message to which the message authentication code is not added, such as the message used for the negotiation of the message authentication algorithm or the message used for the notification of the authentication identifier, is not illustrated in FIG. 2.

Before a detailed description of the sequence, the key hierarchy retained by the child node 10-1 and the message format of the message transmitted and received between the child node 10-1 and the parent node 20 will be described with reference to FIG. 2.

Figure 3:
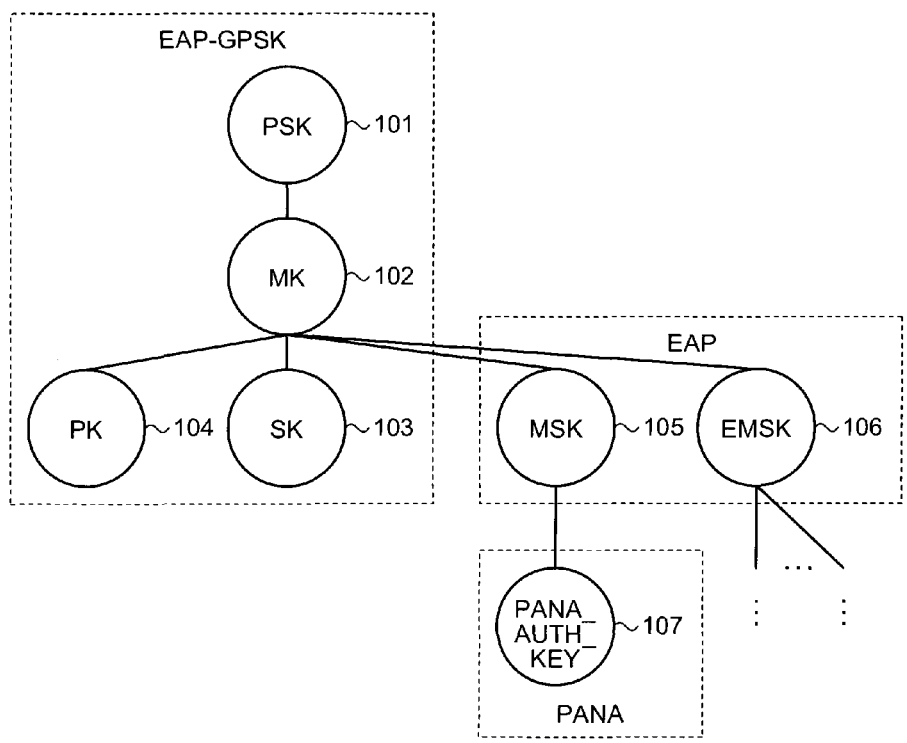
FIG. 3 is a view illustrating a key hierarchy according to the embodiment.

FIG. 3 is a view illustrating one example of a key hierarchy retained by the child node 10-1 in this embodiment. When the parent node 20 and the application server 30 use PANA (RFC 5191) as the network authentication protocol, and use EAP authentication method EAP-GPSK (RFC 5433) on the PANA, these authentication protocols employ the key hierarchy illustrated in FIG. 3.

In the example in FIG. 3, a PSK (Pre-Shared Key) 101 is a common key for a shared key authentication used in EAP-GPSK, an MK (Master Key) 102 is a master key derived from the PSK 101, an SK (Secret Key) 103 is a key used to generate a message authentication code of the EAP-GPSK, a PK 104 is a key used for a payload encryption of the EAP-GPSK, an MSK (Master Session Key) 105 and EMSK (Extended MSK) 106 are keys exported to the lower-level layer by the EAP, and a PANA_AUTH_KEY 107 is a key used to generate the message authentication code of the message of the PANA. In the example in FIG. 3, the PK 104 is the key used for the payload encryption of the EAP-GPSK. However, the key used for the payload encryption is not limited thereto and may be the one belonging to the key hierarchy below the EMSK 106.

Figure 4:
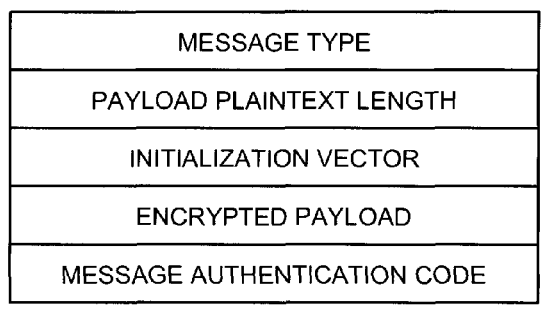
FIG. 4 is a view illustrating an example of a common message format according to the embodiment.

FIG. 4 is a view illustrating one example of a common message format used by the message. In the example in FIG. 4, the common message format includes a message type, a payload plaintext length, an initialization vector, an encrypted payload, and a message authentication code.

The message type indicates a type of a message transmitted and received between the child node 10-1 and the parent node 20. It stores an integer value for distinguishing the data authentication request, the data authentication response, the registration request, the registration response, the key request, and the key response.

The payload plaintext length stores an octet length of the payload plaintext of the message indicated by the message type.

The initialization vector stores a random value. The random value is used to inhibit a replay attack to the encryption to the encrypted payload and the decryption from the encrypted payload.

The encrypted payload stores the payload of the message indicated by the message type, the payload being encrypted by an encryption key (common key) shared between the child node 10-1 and the parent node 20. When the encryption is not needed, the encrypted payload stores the payload indicated by the message type as being a plaintext.

The message authentication code stores the value of the message authentication code for the message type, the payload plaintext length, the initialization vector, and the encrypted payload. The value of the message authentication code is generated by using the message authentication key (common key) shared between the child node 10-1 and the parent node 20.

Figure 5:
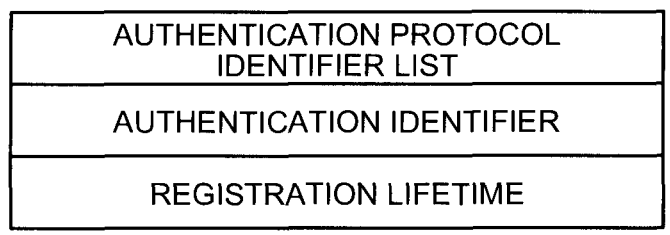
FIG. 5 is a view illustrating an example of a payload format of a registration request according to the embodiment.

FIG. 5 is a view illustrating one example of a payload format of the registration request in this embodiment. In the example in FIG. 5, the payload format of the registration request includes an authentication protocol identifier list, an authentication identifier, and a registration lifetime (value of a registration period).

Figure 6:
FIG. 6 is a view illustrating an example of a payload format of a registration response according to the embodiment.

FIG. 6 is a view illustrating one example of a payload format of the registration response in this embodiment. In the example in FIG. 6, the payload format of the registration response includes a status. The status indicates whether the registration of the child node whose registration is requested by the registration request is successful or ends in failure. If it is successful, 0 is stored, and if it ends in failure, a value other than 0 indicating the reason of the failure is stored.

Figure 7:
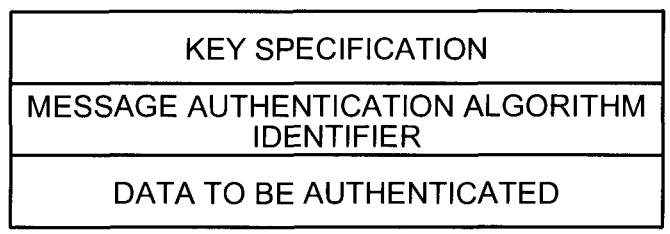
FIG. 7 is a view illustrating an example of a payload format of a data authentication request according to the embodiment.

FIG. 7 is a view illustrating one example of a payload format of the data authentication request in this embodiment. In the example in FIG. 7, the payload format of the data authentication request includes a key specification, a message authentication algorithm identifier, and data to be authenticated.

Figure 8:
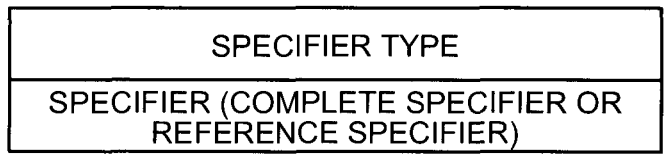
FIG. 8 is a view illustrating an example of a key specification according to the embodiment of the embodiment.

FIG. 8 is a view illustrating one example of the key specification in this embodiment. In the example in FIG. 8, the key specification includes a specifier type, and a specifier. The specifier type indicates either one of a complete specifier and a reference specifier. When the specifier type indicates the complete specifier, the complete specifier is stored in the specifier. When the specifier type indicates the reference specifier, the reference specifier that is an integer value is stored in the specifier. When only the complete specifier is used for the specifier (when the reference specifier is not supported), the specifier type can be eliminated.

Figure 9:
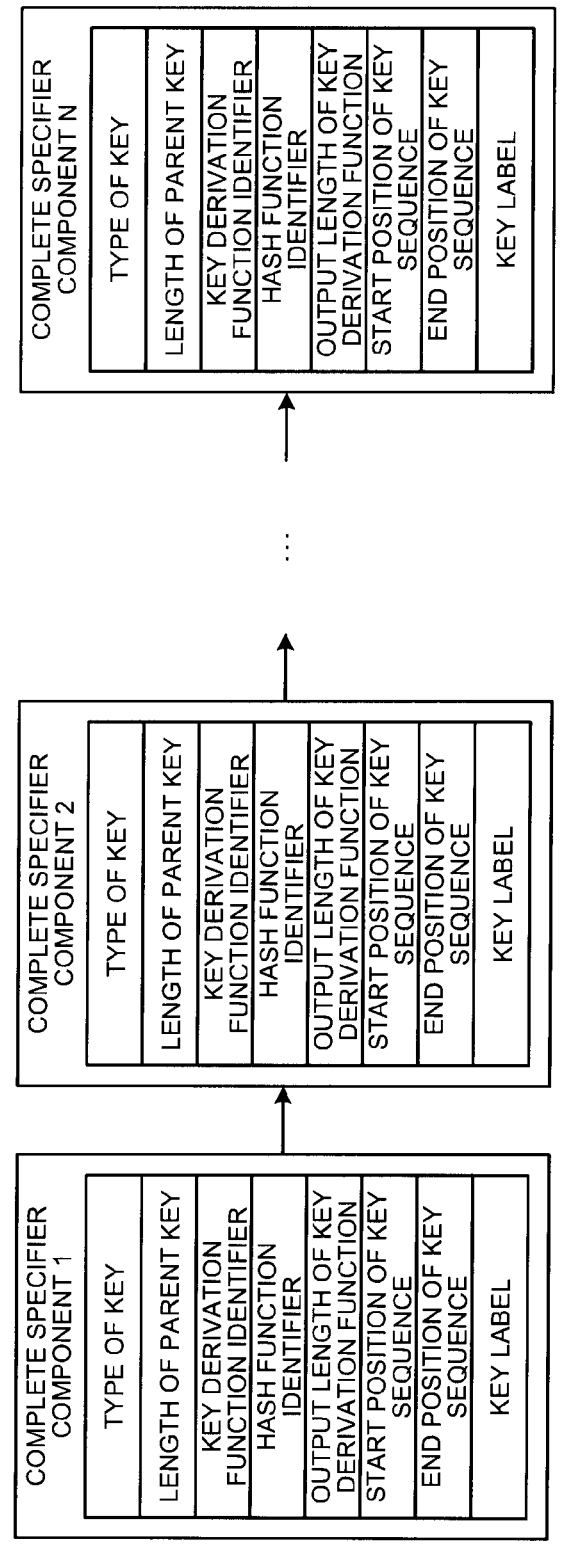
FIG. 9 is a view illustrating an example of a complete specifier according to the embodiment.

FIG. 9 is a view illustrating one example of the complete specifier in this embodiment. In the example in FIG. 9, the complete specifier is defined as a sequential list of complete specifier components. Each complete specifier component includes fields of a key type, a key length of a parent key, a key derivation function identifier, a hash function identifier, a key derivation function output length, a start position of a key sequence during the output of the key derivation function, an end position of the key sequence during the output of the key derivation function, and a key label.

The key type (hereinafter sometimes referred to as "T") is a type of the key to be derived. The length of the parent key (hereinafter sometimes referred to as "P") is an octet length of the parent key used to derive the key. The key derivation function identifier (the key derivation function is sometimes referred to as "D" below) is an identifier of the key derivation function used to derive the key with an arbitrary length. The hash function identifier (the hash function is sometimes referred to as "H" below) is an identifier of the hash algorithm used in the key derivation function. The start position (hereinafter sometimes referred to as "s") of a key sequence during the output of the key derivation function is a start position of a key derived during the output sequence of the key derivation function. The end position (hereinafter sometimes referred to as "e") of the key sequence during the output of the key derivation function is an end position of a key derived during the output sequence of the key derivation function. The key label (hereinafter sometimes referred to as "L") is an input parameter of the key derivation function.

When the parent key is defined as KP, the child node 10-1 generates a key K according to an equation (1) by using the key specification specified by the complete specifier illustrated in FIG. 9 from the parent node 20.

$$K=KDF\_P(KP, f(L))\ [s, e] \quad (1)$$

L1 and L2 are labels undisclosed to the parent node 20, and determined by the key type T. f(L) is a function generating a certain octet string from the label L. f(L)=L1∥L∥L2 is used as one example of f(L). The L1 and L2 may be NULL. KDF_P (KP, f(L)) is an octet string with an arbitrary length generated by the key derivation function D using the hash function H from the key KP with the octet length P and the octet string f(L). KDF_P (KP, f(L)) is referred to as S below. S[s, e] is a function taking the octet string having the length (e−s+1) from the s-th octet to the e-th octet of the octet string S.

Examples of the key derivation function include GKDF (Generalized Key Derivation Function) described in RFC 5433 and prf+ described in RFC 5996. The key derivation function may the one in which the P octet at the head of the output octet string is the same as the key KP. This configuration can also be applied to the case where the parent key is used as the child key, such as the case where the message authentication code is generated by using the key of the uppermost hierarchy.

Figure 10:
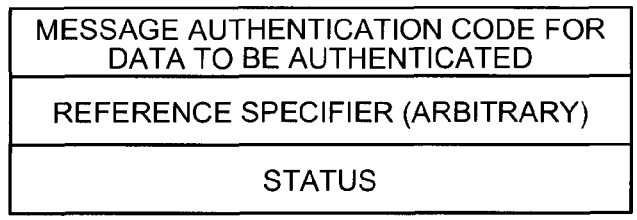
FIG. 10 is a view illustrating an example of a payload format of a data authentication response according to the embodiment.

FIG. 10 is a view illustrating one example of a payload format of the data authentication response in this embodiment. In the example in FIG. 10, the payload format of the data authentication response includes the message authentication code for the data to be authenticated, the reference specifier, and the status. Whether the reference specifier is included or not in the status is optionally determined. When the reference specifier is included in the data authentication response, the transmission source of the data authentication response assigns the value of the reference specifier. The status indicates whether the generation of the message authentication code is successful or ends in failure. If it is successful, 0 is stored, and if it ends in failure, a value other than 0 indicating the reason of the failure is stored.

Figure 11:
FIG. 11 is a view illustrating an example of a payload format of a key request according to the embodiment.

FIG. 11 is a view illustrating one example of the payload format of the key request in this embodiment. In the example in FIG. 11, the payload format of the key request includes the key specification. The detail of the key specification is as described with reference to FIGS. 8 and 9.

Figure 12:
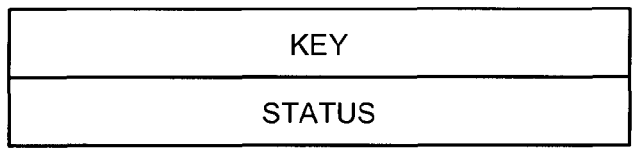
FIG. 12 is a view illustrating an example of a payload format of a key response according to the embodiment.

FIG. 12 is a view illustrating one example of a payload format of the key response in this embodiment. In the example in FIG. 12, the payload format of the key response includes the key and the status. The status indicates whether the acquisition of the key is successful or ends in failure. If it is successful, 0 is stored, and if it ends in failure, a value other than 0 indicating the reason of the failure is stored.

The payload of each message described with reference to FIGS. 5 to 7 and FIGS. 10 to 12 is encrypted, and stored in the encrypted payload of the common message format described in FIG. 4. If the encryption is unnecessary, it is stored as being a plaintext.

Next, the sequence will be described in detail.

Firstly, the child node 10-1 transmits the registration request (L, ID, T) to the parent node 20 (Step S101). Here, it is supposed that L is the authentication protocol identifier list, the ID is the authentication identifier, and T is the registration lifetime (value of the registration period).

Subsequently, the parent node 20 registers the child node 10-1, and transmits the registration response (SR1) to the child node 10-1 during the period indicated by the registration lifetime T (Step S103). It is supposed here that SR1 is a status. Thereafter, the parent node 20 starts the authentication protocol X. At a predetermined timing after (during) the start of the authentication protocol X, the authentication protocol Y is started from the authentication protocol X.

It is supposed that the transmission event then occurs after (during) the start of the authentication protocol Y. It is supposed here that the message Y1 is a message GPSK-2 of the EAP-GPSK. In this case, the parent node 20 transmits the data authentication request 1 (SY1, AY, DY1) to the child node 10-1 in order to acquire the message authentication code necessary for the transmission of the message Y1 (Step S105). It is supposed here that the SY1 is the key specification of the SK 103 (see FIG. 3), the AY is the message authentication algorithm identifier, and DY1 is the data to be authenticated of the message Y1.

Figure 13:
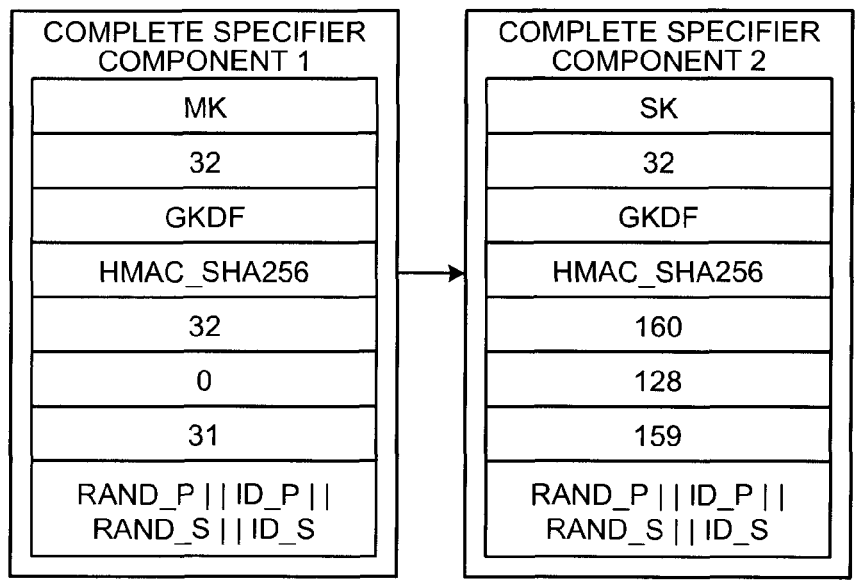
FIG. 13 is a view illustrating an example of a complete specifier to SK according to the embodiment.

FIG. 13 is a view illustrating one example of the complete specifier to the SK 103. In the example in FIG. 13, the complete specifier is defined as a sequential list, including two components which are a complete specifier component 1, and a complete specifier component 2 from the head. The complete specifier component 1 corresponds to the MK 102 (see FIG. 3), while the complete specifier component 2 corresponds to the SK 103 (see FIG. 3). In both the MK 102 and SK 103, the octet length of the parent key is 32 octets. The GKDF is used for the key derivation function, and HMAC_SHA256 is used for the hash function.

Next, the child node 10-1 transmits the authentication response 1 (CY1, SD1) to the parent node 20 (Step S107). It is supposed here that the CY1 is the message authentication code for the data to be authenticated DY1, and the SD1 is the status.

Then, the parent node transmits the message Y1 (DY1, CY1) to the application server 30 (Step S109).

The parent node 20 then receives the message Y2 (CY2, EY2) from the application server 30 (Step S111). It is supposed here that the message Y2 is the message GPSK-3 of the EAP-GPSK, the CY2 is the message authentication code for the message Y2, and the EY2 is the encrypted data of the message Y2.

Next, the parent node 20 transmits the key request (SY2) to the child node 10-1 (Step S113). It is supposed here that the SY2 is supposed to be the key specification of the PK 104 (see FIG. 3).

The child node 10-1 transmits the key response (K, SK) to the parent node 20 (Step S115). The K is supposed to be the PK 104, and the SK is supposed to be the status.

Then, the parent node 20 decrypts the EY2 by using the K so as to acquire DY2. The DY2 is supposed to be the data to be authenticated of the message Y2. The parent node 20 then transmits the data authentication request 2 (SY1, AY, DY2) to the child node 10-1 (Step S117).

Next, the child node 10-1 transmits the data authentication response 2 (CY2, SD2) to the parent node 20 (Step S119). The CY2 is supposed to be the message authentication code for the data to be authenticated DY2, and the SD2 is supposed to be the status. The parent node 20 confirms that the message authentication code for the message Y2 and the message authentication code for the data authentication response 2 are CY2, and that they agree with each other.

Then, it is supposed that the transmission event for the message Y3 occurs. The message Y3 is supposed to be the message GPSK-4 of the EAP-GPSK. In this case, the parent node 20 transmits the data authentication request 3 (SY1, AY, DY3) to the child node 10-1 in order to acquire the message authentication code necessary for the transmission of the message Y3 (Step S121). The DY3 is supposed to be the data to be authenticated of the message Y3.

Then, the child node 10-1 transmits the data authentication response 3 (CY3, SD3) to the parent node 20 (Step S123). The CY3 is supposed to be the message authentication code for the data to be authenticated DY3, and the SD3 is supposed to be the status.

Next, the parent node 20 transmits the message Y3 (DY3, CY3) to the application server 30 (Step S125).

Thus, the message authentication process involved with the authentication protocol Y is completed.

Subsequently, the parent node 20 receives the message X1 (DX1, CX1) of the authentication protocol X from the application server 30 (Step S127). It is supposed here that the C bit is turned on in the PANA-Auth-Request (PAR) message in the message X1. The DX1 is supposed to be the data to be authenticated of the message X1, and the CX1 is supposed to be the message authentication code for the data to be authenticated DX1.

Then, the parent node 20 transmits the data authentication request 4 (SX, AX, DX1) to the child node 10-1 (Step S129). The SX is supposed to be the key specification of the PANA_AUTH_KEY_107 (see FIG. 3), and the AX is supposed to be the message authentication algorithm identifier.

Figure 14:
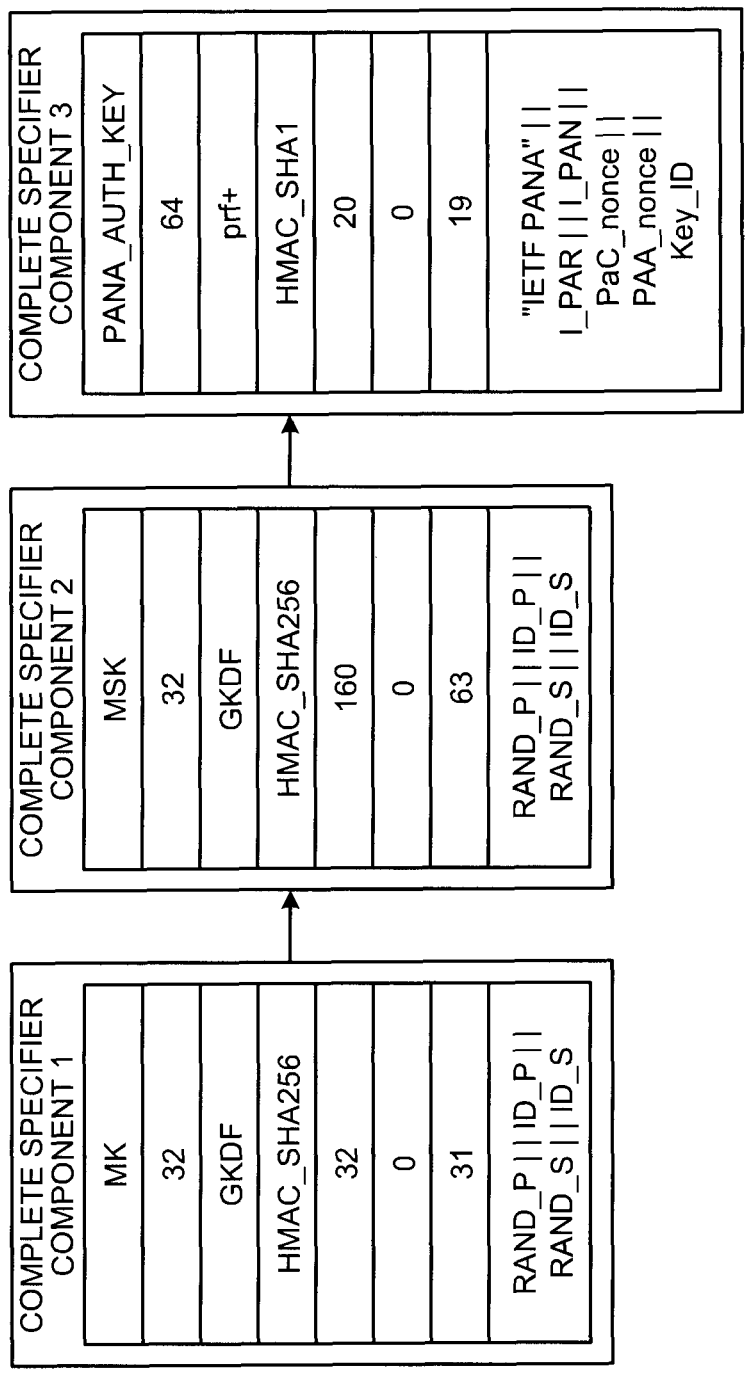
FIG. 14 is a view illustrating an example of a complete specifier to PANA_AUTH_KEY according to the embodiment.

FIG. 14 is a view illustrating one example of the complete specifier to the PANA_AUTH_KEY 107. In the example in FIG. 14, the complete specifier is defined as a sequential list, including three components which are the complete specifier component 1, the complete specifier component 2, and a complete specifier component 3 from the head. The complete specifier component 1 corresponds to the MK 102 (see FIG. 3), the complete specifier component 2 corresponds to the MSK 105 (see FIG. 3), and the complete specifier component 3 corresponds to the PANA_AUTH_KEY 107 (see FIG. 3). In the MK 102, the octet length of the parent key is 32 octets, wherein the GKDF is used for the key derivation function, and HMAC_SHA256 is used for the hash function. In the MSK 105, the octet length of the parent key is 32 octets, wherein the GKDF is used for the key derivation function, and HMAC_SHA256 is used for the hash function. In the PANA_AUTH_KEY 107, the octet length of the parent key is 64 octets, where the prf+ is used for the key derivation function, and HMAC_SHA1 is used for the hash function.

Subsequently, the child node 10-1 transmits the data authentication response 4 (CX1, SD4) to the parent node 20 (Step S131). The SD4 is supposed to be the status. The parent node 20 confirms that the message authentication code of the message X1 and the message authentication code for the data authentication response 4 are both CX1, and that they agree with each other.

It is supposed that the transmission event of the message X2 occurs next. It is supposed here that the C bit is turned on in the PANA-Auth-Answer (PAN) message of the PANA in the message X2. In this case, the parent node 20 transmits the data authentication request 5 (SX, AX, DX2) to the child node 10-1 in order to acquire the message authentication code necessary for the transmission of the message X2 (Step S133). The DX2 is supposed to be the data to be authenticated of the message X2.

The child node 10-1 transmits the data authentication response 5 (CX2, SD5) to the parent node 20 (Step S135). The CX2 is supposed to be the message authentication code for the data to be authenticated DX2, and the SD5 is supposed to be the status.

The parent node 20 transmits the message X2 (DX2, CX2) to the application server 30 (Step S137).

Figure 15:
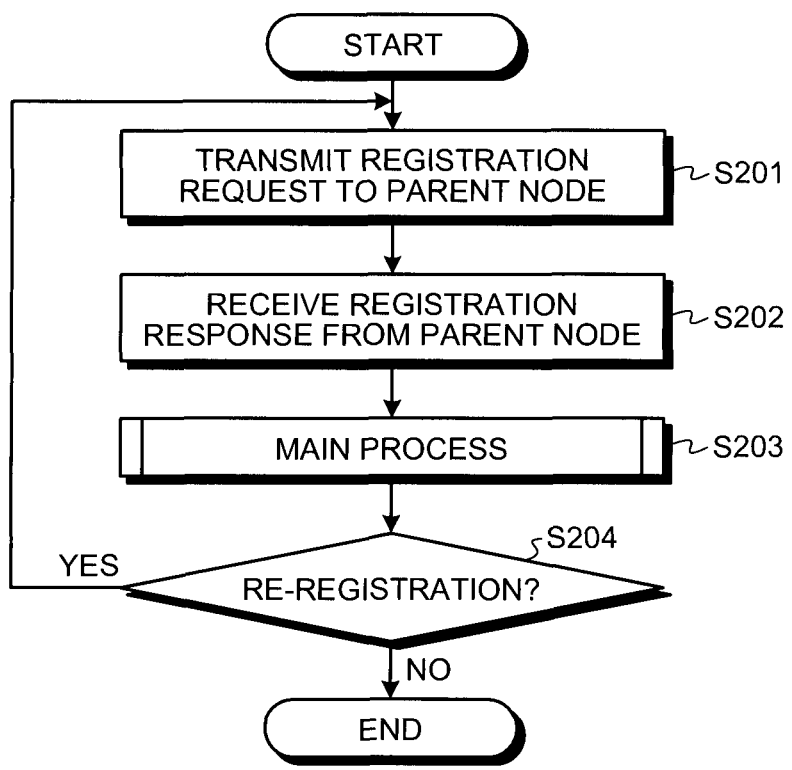
FIG. 15 is a flowchart illustrating an example of a process of a child node according to the embodiment.

FIG. 15 is a flowchart illustrating one example of a process executed by the child node 10-1 in this embodiment.

The registration unit 11 firstly transmits the registration request to the parent node 20 (Step S201).

The registration unit 11 receives the registration response from the parent node 20 (Step S202).

The main processing unit 13 executes a main process (Step S203). The detail of the main process will be described later.

The registration unit 11 checks whether or not the registration timeout occurs, and the re-registration is needed for the parent node 20 (Step S204). If the re-registration is needed (Yes in Step S204), the process returns to the Step S201. If the re-registration is not needed (No in Step S204), the process is ended.

Figure 16:
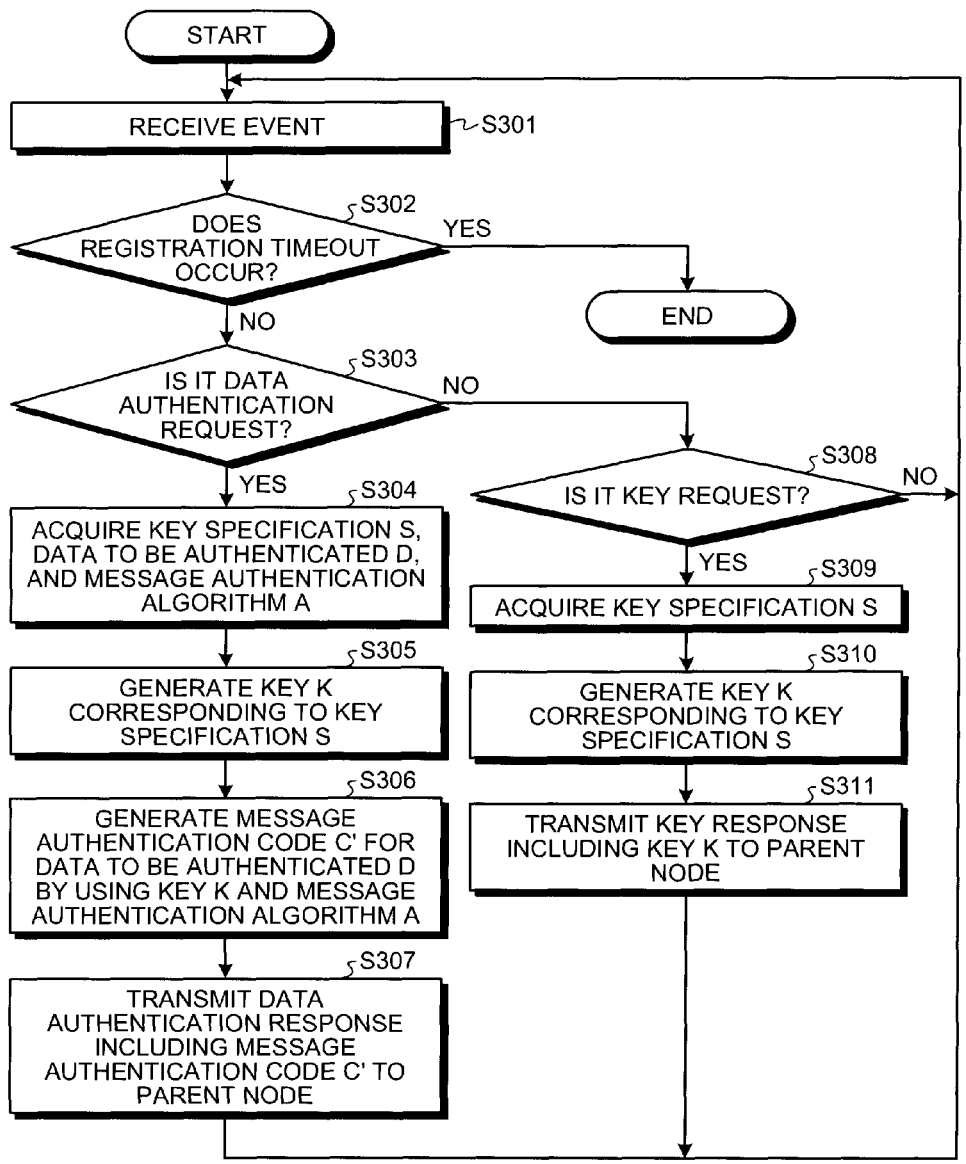
FIG. 16 is a flowchart illustrating an example of a main process according to the embodiment.

FIG. 16 is a flowchart illustrating one example of the main process in the present embodiment.

The main processing unit 13 firstly receives an event from the parent node 20 (Step S301).

The main processing unit 13 then checks whether or not the received event is the one indicating the registration timeout (Step S302). If it is the event indicating the registration timeout (Yes in Step S302), the process is ended.

If it is not the event indicating the registration timeout (No in Step S302), the main processing unit 13 checks whether the received event is the data authentication request or not (Step S303).

If the received event is the data authentication request (Yes in Step S303), the main processing unit 13 acquires the key specification S, the data to be authenticated D, and the message authentication algorithm identifier from the data authentication request, and further acquires the message authentication algorithm A identified by the message authentication algorithm identifier (Step S304).

The key generating unit 15 generates the key K corresponding to the key specification S by using the retained key hierarchy and the key specification S (Step S305). The main processing unit 13 may generate the key cache (S, K), and may retain the resultant. When the main processing unit 13 retains the key cache (S, K), the generation of the key K by the key generating unit 15 may be skipped, and the key K may be acquired from the key cache (S, K).

The main processing unit 13 then generates a message authentication code C' for the data to be authenticated D by use of the key K and the message authentication algorithm A (Step S306).

The main processing unit 13 then transmits the data authentication response including the message authentication code C' to the parent node 20 (Step S307). Then, the process returns to Step S301.

On the other hand, when the received event is not the data authentication request (No in Step S303), the main processing unit 13 checks whether the received event is the key request or not (Step S308). If it is not the key request (No in Step S308), the process returns to Step S301.

When the received event is the key request (Yes in Step S308), the main processing unit 13 acquires the key specification S from the key request (Step S309).

Then, the key generating unit 15 generates the key K corresponding to the key specification S by use of the retained key hierarchy and the key specification S (Step S310).

The main processing unit 13 then transmits the key response including the key K to the parent node 20 (Step S311). Then, the process returns to Step S301.

Figure 17:
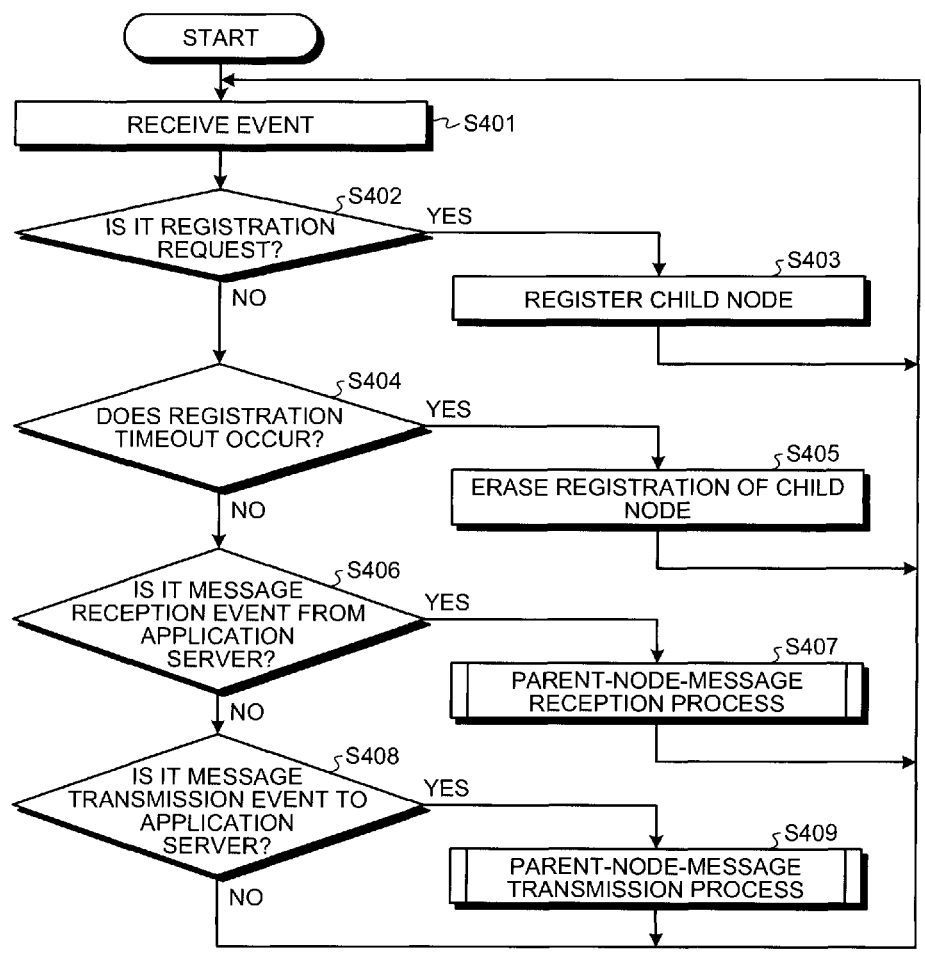
FIG. 17 is a flowchart illustrating an example of a process of a parent node according to the embodiment.

FIG. 17 is a flowchart illustrating one example of the process executed by the parent node 20 in this embodiment.

The authentication protocol processing unit 23 receives an event (Step S401).

The authentication protocol processing unit 23 checks whether the received event is the registration request or not (Step S402).

When the received event is the registration request (Yes in Step S402), the registration unit 21 registers the child node to which the registration request is transmitted (Step S403). Then, the process returns to Step S401.

When the received event is not the registration request (No in Step S402), the registration unit 21 checks whether or not there is the child node having the registration timeout out of the registered child nodes (Step S404).

If there is the child node having the registration timeout (Yes in Step S404), the registration unit 21 erases the registration of the child node (Step S405). Then, the process returns to Step S401.

If there is no child node having the registration timeout (No in Step S404), the authentication protocol processing unit 23 checks whether the received event is the message reception event from the application server 30 or not (Step S406).

If the received event is the message reception event from the application server 30 (Yes in Step S406), the authentication protocol processing unit 23 executes a parent-node-message reception process (Step S407). The detail of the parent-node-message reception process will be described later. Then, the process returns to Step S401.

When the received event is not the message reception event from the application server 30 (No in Step S406), the authentication protocol processing unit 23 checks whether the received event is the message transmission event from the application server 30 or not (Step S408).

When the received event is not the message transmission event from the application server (No in Step S408), the process returns to Step S401.

When the received event is the message transmission event from the application server 30 (Yes in Step S408), the authentication protocol processing unit 23 executes a parent-node-message transmission process (Step S409). The detail of the parent-node-message transmission process will be described later. Then, the process returns to Step S401.

Figure 18:
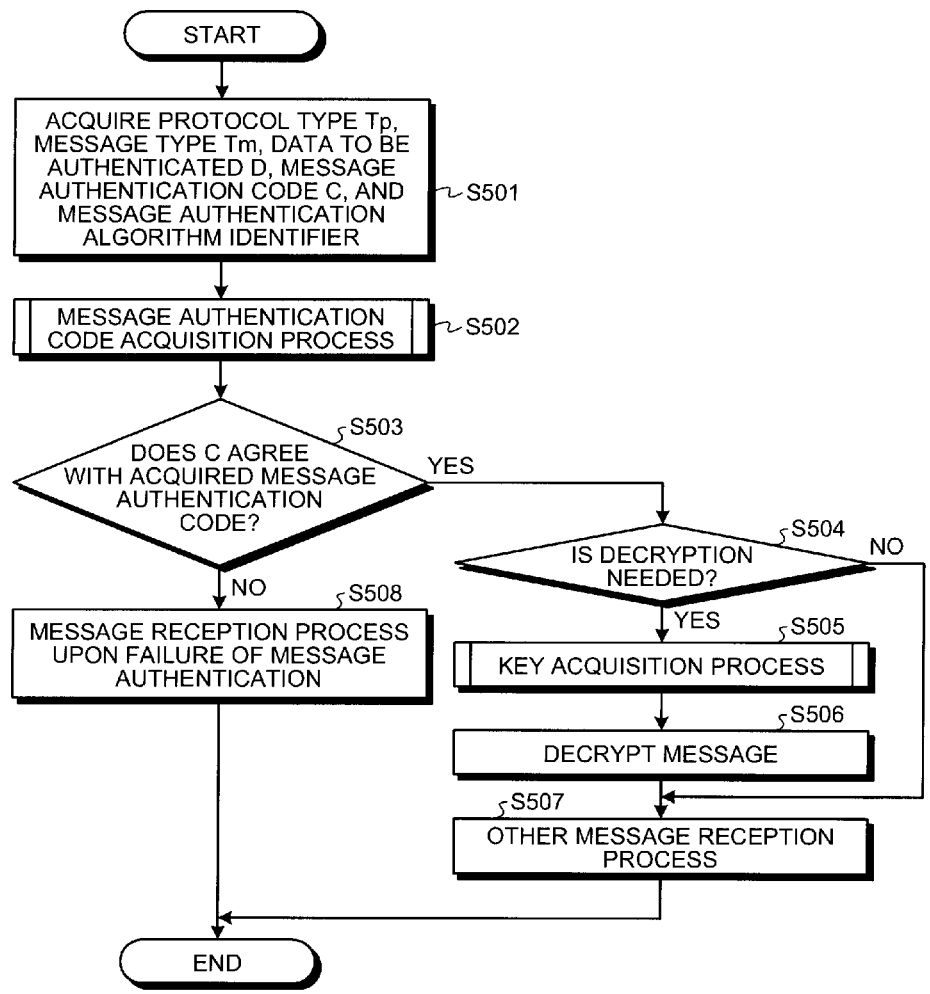
FIG. 18 is a flowchart illustrating an example of a parent-node-message reception process according to the embodiment.

FIG. 18 is a flowchart illustrating one example of the parent-node-message reception process in this embodiment.

Firstly, when receiving the message from the application server 30, the authentication protocol processing unit 23 determines the child node used for the authentication of the received message, and acquires the protocol type Tp, message type Tm, data to be authenticated D, message authentication code C, and message authentication algorithm identifier (Step S501).

The authentication protocol processing unit 23 then executes a message authentication code acquisition process (Step S502). The detail of the message authentication code acquisition process will be described later.

The authentication protocol processing unit 23 checks whether or not the message authentication code C' acquired in Step S502 agrees with the message authentication code C acquired in Step S501 (Step S503).

When both message authentication codes agree with each other (Yes in Step S503), the authentication protocol processing unit 23 checks whether the decryption of the received message is necessary or not (Step S504). When the decryption of the received message is unnecessary (No in Step S504), the process proceeds to Step S507.

When the decryption of the received message is necessary (Yes in Step S504), the authentication protocol processing unit 23 executes a key acquisition process (Step S505). The detail of the key acquisition process will be described later.

The authentication protocol processing unit 23 decrypts the received message by use of the key acquired in the key acquisition process (Step S506).

The authentication protocol processing unit 23 executes the other message reception process (Step S507), and the process is ended.

On the other hand, when both message authentication codes do not agree with each other (No in Step S503), the authentication protocol processing unit 23 executes a message reception process upon the failure of the message authentication (Step S508), and the process is ended.

In the example in FIG. 18, since the encrypted message does not include the message authentication code C, the message is decrypted after the message authentication. However, when the encrypted message includes the message authentication code C, the message authentication is executed after the message is decrypted.

Figure 19:
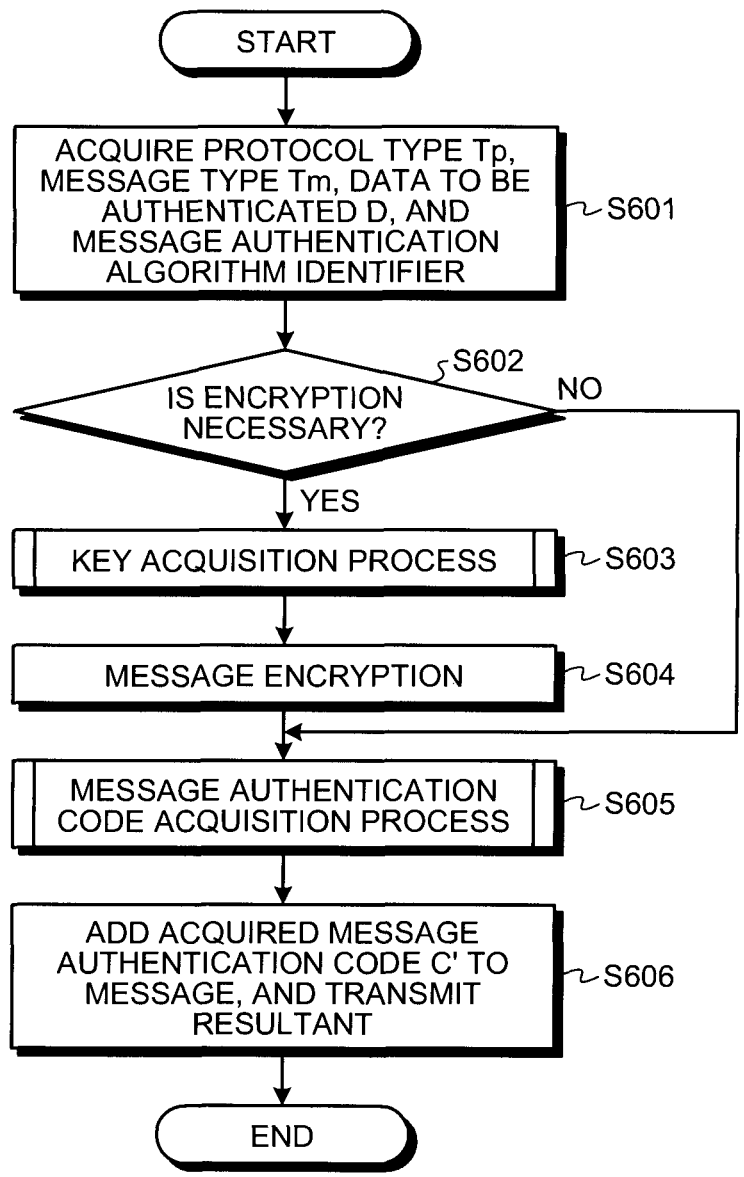
FIG. 19 is a flowchart illustrating an example of a parent-node-message transmission process according to the embodiment.

FIG. 19 is a flowchart illustrating an example of the parent-node-message transmission process in this embodiment.

When the message transmission event to the application server 30 occurs, the authentication protocol processing unit 23 determines the child node used for the authentication of the message that is to be transmitted, and acquires the protocol type Tp, message type Tm, data to be authenticated D, and message authentication algorithm identifier (Step S601).

The authentication protocol processing unit 23 then checks whether the encryption of the message that is to be transmitted is necessary or not (Step S602). When the encryption of the message that is to be transmitted is unnecessary (No in Step S602), the process proceeds to Step S605.

When the encryption of the message that is to be transmitted (Yes in Step S602) is needed, the authentication protocol processing unit 23 executes the key acquisition process (Step S603). The detail of the key acquisition process will be described later.

The authentication protocol processing unit 23 then encrypts the received message by use of the key acquired in the key acquisition process (Step S604).

The authentication protocol processing unit 23 then executes the message authentication code acquisition process (Step S605). The detail of the message authentication code acquisition process will be described later.

The authentication protocol processing unit 23 adds the message authentication code C' acquired in Step S605 to the encrypted message, and transmits the resultant to the application server (Step S606).

Figure 20:
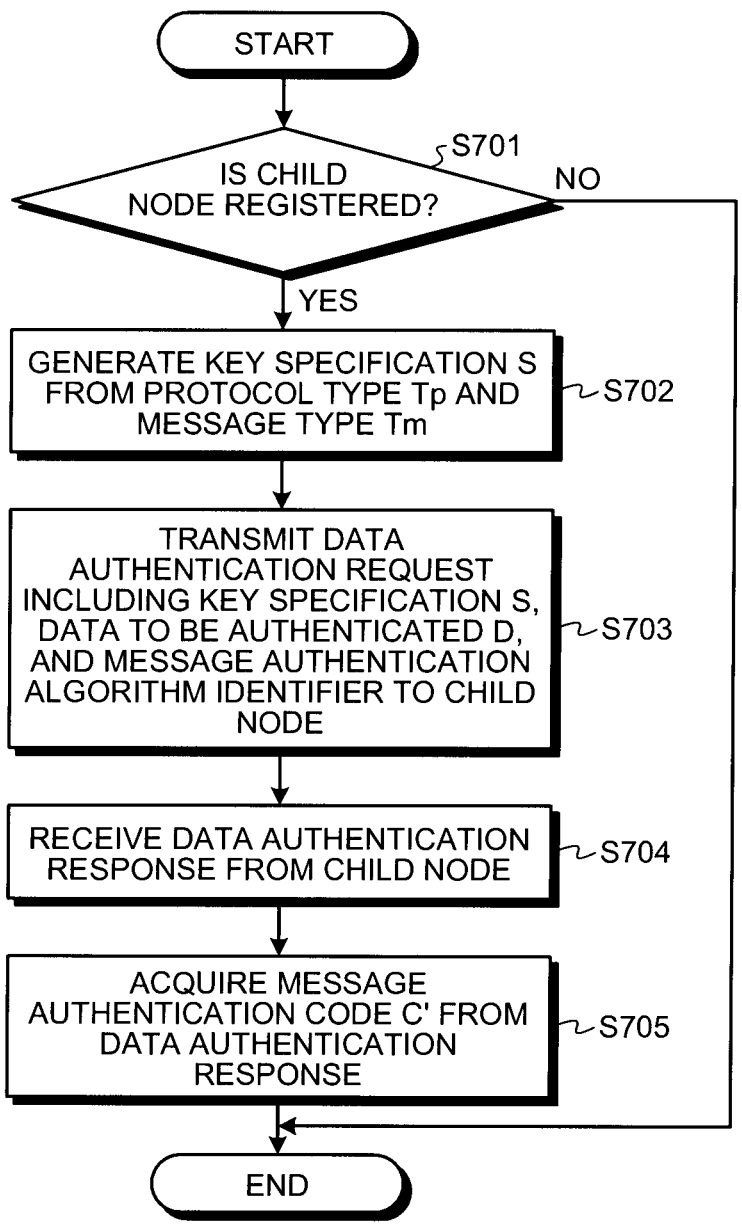
FIG. 20 is a flowchart illustrating an example of a message authentication code acquisition process according to the embodiment.

FIG. 20 is a flowchart illustrating one example of the message authentication code acquisition process in this embodiment.

The authentication protocol processing unit 23 firstly checks whether or not the child node used for the authentication of the message is registered (Step S701). If the child node used for the authentication of the message is not registered (No in Step S701), the process is ended.

If the child node used for the authentication of the message is registered (Yes in Step S701), the key specification generating unit 25 generates the key specification S from the protocol type Tp and the message type Tm (Step S702).

The authentication protocol processing unit 23 then transmits the data authentication request including the key specification S, the data to be authenticated D, and the message authentication algorithm identifier to the child node used for the authentication of the message (Step S703), and receives the data authentication response including the message authentication code C' from the child node (Step S704).

Next, the authentication protocol processing unit 23 acquires the message authentication code C' from the data authentication response (Step S705).

Figure 21:
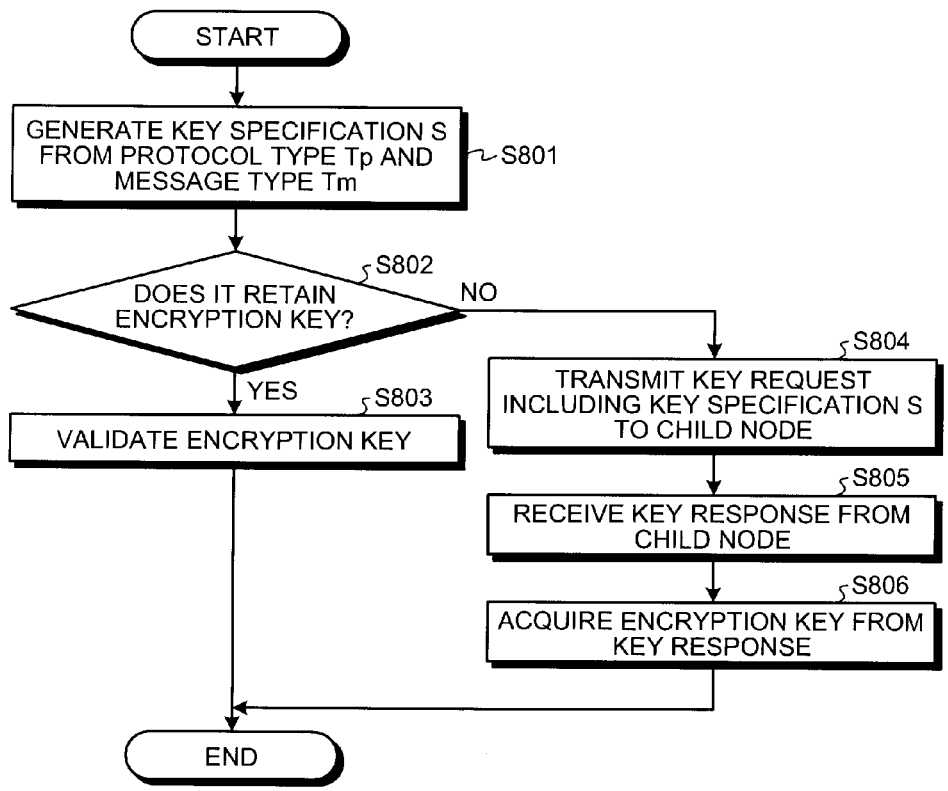
FIG. 21 is a flowchart illustrating an example of a key acquisition process according to the embodiment.

FIG. 21 is a flowchart illustrating one example of the key acquisition process.

The key specification generating unit 25 firstly generates the key specification S from the protocol type Tp, and the message type Tm (Step S801).

The authentication protocol processing unit 23 then checks whether or not it retains the encryption key corresponding to the key specification S (Step S802).

When retaining the encryption key corresponding to the key specification S (Yes in Step S802), the authentication protocol processing unit 23 validates the retained encryption key (Step S803), and then, the process is ended.

When not retaining the encryption key corresponding to the key specification S (No in Step S802), the authentication protocol processing unit 23 transmits the key request including the key specification S to the child node used for the authentication of the message (Step S804), and receives the key response including the encryption key from the child node (Step S805).

The authentication protocol processing unit 23 then acquires the encryption key from the key response (Step S806). The authentication protocol processing unit 23 may retain the acquired encryption key in association with the key specification S.

The plural child nodes 10-1 to 10-N and the parent node 20 in the above-mentioned embodiment includes, for example, a control device such as a CPU, a storage device such as ROM or RAM, an external storage device such as HDD or SD, and a communication device such as a communication I/F, and they can be realized by a hardware structure utilizing a normal computer.

In this case, a program executed in the plural child nodes 10-1 to 10-N and the parent node 20 is provided as being installed beforehand in the ROM.

A program executed in the plural child nodes 10-1 to 10-N and the parent node 20 is recorded on a computer-readable recording medium such as CD-ROM, CD-R, memory card, DVD, or flexible disk (FD) in an installable form or executable form, and provided as a computer program product.

The program executed in the plural child nodes 10-1 to 10-N and the parent node 20 according to the present embodiment may be stored on a computer connected to the network such as the Internet, and provided as being downloaded through the network. The program executed in the plural child nodes 10-1 to 10-N and the parent node 20 according to the present embodiment may be provided or distributed through the network such as the Internet.

The program executed in the plural child nodes 10-1 to 10-N and the parent node 20 according to the present embodiment has a module structure that allows the above-mentioned respective units to be realized on the computer. As a real hardware, the respective units can be realized on the computer by the configuration in which the CPU reads the program on the RAM from the HDD, and executes the same.

As described above, according to the communication system according to the embodiment, none of the child nodes needs to manage a state of the authentication protocol, and each child node only generates the key based upon the key specification and generates the message authentication code using the generated key, whereby the communication system can be simplified without deteriorating security.

The child node in the embodiment only retains the root key of the key hierarchy, and the other keys may only be generated from the root key and the key specification as needed. Therefore, a memory size of the child node can be reduced.

From the above, as the number of the child nodes increases, hardware cost of the whole communication system can be reduced due to the simplification of the child node.

In the embodiment, the parent node executes, in place of the child node, the protocol process other than the message authentication for the other party authentication to the child node. Therefore, the other party authentication using the EAP or PANA is possible, even if the child node is simplified. Accordingly, this configuration can prevent an unauthorized device from establishing communication with the application server through the parent node.

In the embodiment, the parent node does not retain a key hierarchy. Therefore, the key hierarchy can be prevented even if the parent node is taken over by an attacker.

In the embodiment, the encryption key for the data to be authenticated is generated from the key hierarchy retained by the child node. Therefore, even if an attacker takes over the parent node, the confidentiality and completeness of the data to be authenticated can be maintained, whereby the influence to the child node and the application server can be kept to the minimum.

Since the parent node in the embodiment does not have to transmit information unique to the authentication protocol to the child node, the size and number of the message transmitted and received between the parent node and the child node can be reduced.

As described above, the embodiment can realize simplification and other party authentication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus that establishes communication with an external apparatus through a higher-level device, the communication apparatus comprising:
    a main processor configured to receive a data authentication request including data to be authenticated, a first key specification, and a message authentication algorithm identifier from the higher-level device; and
    a key generator configured to retain a key hierarchy used by an authentication protocol that is used between the higher-level device and the external apparatus, and to generate a first key by use of the key hierarchy and the first key specification, wherein
    the main processor generates a message authentication code for the data to be authenticated by use of the message authentication algorithm, which is identified by the message authentication algorithm identifier, and the first key, and transmits a data authentication response including the message authentication code to the higher-level device, and
    the first key specification is specified by a complete specifier that is a sequence list of complete specifier components including a type of key, a length of a parent key, a key derivation function identifier, a hash function identifier, an output length of the key derivation function, a start position of a key sequence during the output of the key derivation function, an end position of the key sequence during the output of the key derivation function, and a key label.

2. The communication apparatus according to claim 1, wherein
    the main processor retains a key cache including: a first key specification included in a data authentication request received in the past; and the first key generated from the first key specification, and
    when a first key specification included in a newly received data authentication request agrees with the first key specification included in the key cache, the main processor generates a message authentication code for the data to be authenticated included in the newly received data authentication request, by use of the first key included in the key cache and the message authentication algorithm identified by the message authentication algorithm identifier included in the newly received data authentication request.

3. The communication apparatus according to claim 1, wherein
    the main processor further receives a key request including a second key specification from the higher-level device;
    the key generator further generates a second key by use of the key hierarchy and the second key specification, and
    the main processor further transmits a key response including the second key to the higher-level device.

4. The communication apparatus according to claim 1, further comprising:
    a registration unit configured to transmit, to the higher-level device, a registration request including: a list of identifiers of the authentication protocol that uses the key hierarchy; and its authentication identifier.

5. The communication apparatus according to claim 1, wherein
    the authentication protocol includes a PANA (Protocol for carrying Authentication for Network Access) method and EAP (Extensible Authentication Protocol) method.

6. The communication apparatus according to claim 1, wherein
    the data authentication request or the data authentication response is encrypted or subjected to a message authentication.

7. A communication apparatus that establishes communication with an external apparatus through a higher-level device, the communication apparatus comprising:
    a main processor configured to receive a data authentication request including data to be authenticated, a first key specification, and a message authentication algorithm identifier from the higher-level device; and
    a key generator configured to retain a key hierarchy used by an authentication protocol that is used between the higher-level device and the external apparatus, and to generate a first key by use of the key hierarchy and the first key specification, wherein
    the main processor generates a message authentication code for the data to be authenticated by use of the message authentication algorithm, which is identified by the message authentication algorithm identifier, and the first key, and transmits a data authentication response including the message authentication code to the higher-level device, and
    the first key specification is specified by either one of: a complete specifier that is a sequence list of complete specifier components including a type of key, a length of a parent key, a key derivation function identifier, a hash function identifier, an output length of the key derivation function, a start position of a key sequence during the output of the key derivation function, an end position of the key sequence during the output of the key derivation function, and a key label; and a reference specifier that is an integer value corresponding to the complete specifier, and
    the first key specification includes a specifier type for identifying whether the first key specification is specified by the complete specifier or by the reference specifier.

8. The communication apparatus according to claim 7, wherein
    the value of the reference specifier is assigned by a transmission source of the data authentication response, and is reported by the data authentication response.

9. A communication apparatus that establishes communication between a lower-level device and an external apparatus through oneself, the communication apparatus comprising:
- an authentication protocol processor configured to execute a process, other than a process of generating a message authentication code, out of processes of an authentication protocol used between oneself and the external apparatus; and
- a key specification generator configured to generate a first key specification that allows the lower-level device to generate a first key belonging to a key hierarchy used by the authentication protocol, wherein
- the authentication protocol processor transmits, to the lower-level device, a data authentication request including data to be authenticated, the first key specification, and a message authentication algorithm identifier, and receives, from the lower-level device, a data authentication response including a message authentication code for the data to be authenticated, and
- the first key specification is specified by a complete specifier that is a sequence list of complete specifier components including a type of key, a length of a parent key, a key derivation function identifier, a hash function identifier, an output length of the key derivation function, a start position of a key sequence during the output of the key derivation function, an end position of the key sequence during the output of the key derivation function, and a key label.

10. The communication apparatus according to claim 9, wherein
- the key specification generator further generates a second key specification that allows the lower-level device to generate a second key belonging to the key hierarchy, and
- the authentication protocol processor further transmits a key request including the second key specification to the lower-level device, and receives a key response including the second key generated from the second key specification from the lower-level device.

11. The communication apparatus according to claim 9, further comprising:
- a registration unit configured to receive, from the lower-level device, a registration request including: a list of identifiers of the authentication protocol using the key hierarchy; and an authentication identifier of the lower-level device, and to retain content of the registration request and an address of the lower-level device in association with each other during a registration period of the lower-level device.

12. The communication apparatus according to claim 11, wherein the registration request further includes a value of the registration period.

13. The communication apparatus according to claim 10, wherein
- the external apparatus is an application server,
- the data to be authenticated is application data that is exchanged with the application server,
- the second key is shared with the application server, and
- the authentication protocol processor encrypts or decrypts the application data by use of the second key.

14. The communication apparatus according to claim 9, wherein
- the external apparatus is an application server,
- the data to be authenticated is application data that is exchanged with the application server, and
- the authentication protocol processor executes a message authentication of the application data by use of the message authentication code.

15. The communication apparatus according to claim 9, wherein
- the authentication protocol includes a PANA (Protocol for carrying Authentication for Network Access) method and EAP (Extensible Authentication Protocol) method.

16. The communication apparatus according to claim 9, wherein
- the data authentication request or the data authentication response is encrypted or subjected to a message authentication.

17. A communication apparatus that establishes communication between a lower-level device and an external apparatus through oneself, the communication apparatus comprising:
- an authentication protocol processor configured to execute a process, other than a process of generating a message authentication code, out of processes of an authentication protocol used between oneself and the external apparatus; and
- a key specification generator configured to generate a first key specification that allows the lower-level device to generate a first key belonging to a key hierarchy used by the authentication protocol, wherein
- the authentication protocol processor transmits, to the lower-level device, a data authentication request including data to be authenticated, the first key specification, and a message authentication algorithm identifier, and recieves, from the lower-level device, a data authentication response including a message authentication code for the data to be authenticated, and
- the first key specification is specified by either one of: a complete specifier that is a sequence list of complete specifier components including a type of key, a length of a parent key, a key derivation function identifier, a hash function identifier, an output length of the key derivation function, a start position of a key sequence during the output of the key derivation function, an end position of the key sequence during the output of the key derivation function, and a key label; and a reference specifier that is an integer value corresponding to the complete specifier, and
- the first key specification includes a specifier type for identifying whether the first key specification is specified by the complete specifier or by the reference specifier.

18. The communication apparatus according to claim 17, wherein
- the value of the reference specifier is assigned by a transmission source of the data authentication response, and is reported by the data authentication response.

19. A computer program product comprising a non-transitory computer-readable medium containing a program executed by a computer that establishes communication with an external apparatus through a higher-level device, the program causing the computer to execute:
- receiving a data authentication request including data to be authenticated, a key specification, and a message authentication algorithm identifier from the higher-level device;
- generating a key by use of a key hierarchy, which is used by an authentication protocol used between the higher-level device and the external apparatus, and the key specification;
- generating a message authentication code for the data to be authenticated by use of the message authentication algorithm, which is identified by the message authentication algorithm identifier, and the key; and transmitting a data authentication response including the message authentication code to the higher-level device, wherein the key specification is specified by a complete specifier that is a sequence list of complete specifier components including a type of key, a length of a parent key, a key derivation function identifier, a hash function identifier, output length of the key derivation function, a start position of a key sequence during the output of the key derivation function, an end position of the sequence during the output of the key derivation function, and a key label.

20. A computer program product comprising a non-transitory computer-readable medium containing a program executed by a computer that establishes communication between a lower-level device and an external apparatus through the computer, the program causing the computer to execute:

executing a process, other than a process of generating a message authentication code, out of processes of an authentication protocol used between the computer and the external apparatus;

generating a key specification that allows the lower-level device to generate a key belonging to a key hierarchy used by the authentication protocol;

transmitting, to the lower-level device, a data authentication request including data to be authenticated, the key specification, and a message authentication algorithm identifier; and receiving, from the lower-level device, a data authentication response including a message authentication code for the data to be authenticated, wherein the key specification is specified by a complete specifier that is a sequence list of complete specifier components including a type of key, a length of a parent key, a key derivation function identifier, a hash function identifier, an output length of the key derivation function, a start position of a key sequence during the output of the key derivation function, an end position of the key sequence during the output of the key derivation function, and a key label.

21. A computer program product comprising a non-transitory computer-readable medium containing a program executed by a computer that establishes communication with an external apparatus through a higher-level device, the program causing the computer to execute:

receiving a data authentication request including data to be authenticated, a key specification, and a message authentication algorithm identifier from the higher-level device;

generating a key by use of a key hierarchy, which is used by an authentication protocol used between the higher-level device and the external apparatus, and the key specification;

generating a message authentication code for the data to be authenticated by use of the message authentication algorithm, which is identified by the message authentication algorithm identifier, and the key; and transmitting a data authentication response including the message authentication code to the higher-level device, wherein the key specification is specified by either one of: a complete specifier that is a sequence list of complete specifier components including a type of key, a length of a parent key, a key derivation function identifier, a hash function identifier, an output length of the key derivation function, a start position of a key sequence during the output of the key derivation function, an end position of the key sequence during the output of the key derivation function, and a key label; and a reference specifier that is an integer value corresponding to the complete specifier, and the key specification includes a specifier type for identifying whether the key specification is specified by the complete specifier or by the reference specifier.

22. A computer program product comprising a non-transitory computer-readable medium containing a program executed by a computer that establishes communication between a lower-level device and an external apparatus through the computer, the program causing the computer to execute:

executing a process, other than a process of generating a message authentication code, out of processes of an authentication protocol used between the computer and the external apparatus;

generating a key specification that allows the lower-level device to generate a key belonging to a key hierarchy used by the authentication protocol;

transmitting, to the lower-level device, a data authentication request including data to be authenticated, the key specification, and a message authentication algorithm identifier; and receiving, from the lower-level device, a data authentication response including a message authentication code for the data to be authenticated, wherein the key specification is specified by either one of: a complete specifier that is a sequence list of complete specifier components including a type of key, a length of a parent key, a key derivation function identifier, a hash function identifier, an output length of the key derivation function, a start position of a key sequence during the output of the key derivation function, an end position of the key sequence during the output of the key derivation function, and a key label; and a reference specifier that is an integer value corresponding to the complete specifier, and the key specification includes a specifier type for identifying whether the key specification is specified by the complete specifier or by the reference specifier.

* * * * *

UNITED STATES PATENT AND TRADEMARK OFFICE
CERTIFICATE OF CORRECTION

| | |
|---|---|
| PATENT NO. | : 8,627,078 B2 |
| APPLICATION NO. | : 13/551352 |
| DATED | : January 7, 2014 |
| INVENTOR(S) | : Oba et al. |

It is certified that error appears in the above-identified patent and that said Letters Patent is hereby corrected as shown below:

In the Claims:

Claim 19, column 19, line 12, change "the sequence" to --the key sequence--.

Signed and Sealed this
Thirteenth Day of May, 2014

Michelle K. Lee
*Deputy Director of the United States Patent and Trademark Office*